Dec. 17, 1929.  J. DELON  1,740,076
ELECTRIC CABLE
Filed May 10, 1924
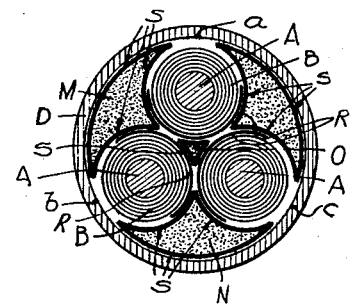
Inventor
Jules Delon
By William C. Linton
Attorney Patented Dec. 17, 1929

1,740,076

UNITED STATES PATENT OFFICE

JULES DELON, OF LYON, FRANCE, ASSIGNOR OF ONE-HALF TO COMPAGNIE GENERALE D'ELECTRICITE, OF PARIS, FRANCE

ELECTRIC CABLE

Application filed May 10, 1924, Serial No. 712,409, and in France December 29, 1923.

The present invention relates to electric cables having multiple conductors employed for the transmission of energy in the form of alternating current.

In the most frequent cases the transmission of energy is effected in the form of three phase current and the cables utilized are formed of three conductors insulated either by paper or by rubber or by any other insulating material.

The conductors once they are insulated are assembled within a lead sheathing. In the spaces formed by the three tangent cylinders there is usually placed a packing of jute, hemp, paper, textile material or any other filling material in order to provide a circular external contour.

During the operation of such a cable the surfaces of the insulating material covering each of the conductors are not equipotential surfaces and consequently the lines of force are not generally normal to said surfaces. As a result they are subject to tangential forces, which are slight when the potential gradient is not itself very high but when the potential gradient exceeds a certain limit the tangential forces result in the gradual destruction of the surface of the insulation and when the phenomenon is continued the insulation may be progressively destroyed throughout its thickness. But it is necessary in order to make cables intended to operate under high tensions to make the insulation work under as high a potential gradient as possible and in order to avoid the destructive effect of the tangential forces spoken of it is necessary to render the equipotential surfaces as nearly as possible concentric to each of the conductors.

Various methods have been suggested in order to obtain this result. In particular it has been proposed to cover the insulating surfaces with thin metal sheets or with metallized sheets of paper. In cables insulated by impregnated paper these various methods present the very grave disadvantage of rendering difficult impregnation of the paper which covers each of the conductors. This disadvantage is only partially avoided by the employment of perforated metallic sheets. The method which forms the subject of the present invention consists in rendering conductive the surface of the central packing as well as that of the three angular packings, and in connecting these conductive surfaces inter se and with the lead sheath. The material forming the packing is either enveloped by a strip of metal or of metallic tissue or by a strip of metallized paper or of metallized tissue or the packings are formed of packets of metallic non-magnetic threads or of threads of jute or of other material rendered conductive by metallization or in any other manner.

In the accompanying drawing, which shows, in cross section, a three conductor cable embodying my invention, the conductors are indicated at A. The insulating layers which cover each of the conductors are indicated at B. The packings the surface of which is rendered conductive are represented at O, M, N, P. The conducting surfaces themselves are indicated by thick lines S.

The lead sheath is indicated by D.

The three conducting surfaces S of the coverings of the packings M, N, P are in contact with the lead sheath of the cable on nearly the entire internal circumference of said sheath as shown in the drawing.

The metallic covering of the central packing O, is connected to the metallic coverings of the packings M, N, P, by thin strips of metal or of metallic tissue R placed transversely in regard to the axis of the cable. These strips of metal or of metallic tissue are arranged in a continuous manner and they are firmly pressed against the metallic covering of the central packing by the conductor lying between the two outer packings thus connected transversely.

It will be seen from the drawing, that a large part of the surface of the insulation which covers each of the conductors is necessarily brought down to the potential of the lead sheath and that the equipotential surfaces $a$, $b$, and $c$ thus remain concentric to the conductors in the parts where the insulating surfaces are adjacent to the conducting surfaces S.

Experience shows that it is precisely in those parts that the destructive phenomena due to the tangential forces are particularly noticeable in cables constructed according to the ordinary methods; the arrangement which forms the subject of the present invention has thus for its effect to avoid these destructive forces in the parts in which they are most dangerous for the preservation of the cable.

This arrangement has also for effect to facilitate the cooling of the cable during its operation.

The conducting surfaces S, contribute in fact by virtue of their good thermal conductivity to lead the heat which is developed within the interior to the exterior of the cable. This is obtained through the metallic connections R between the covering S of the central packing O, and the coverings S of the packings M, N, P and through the contact of the latter with the lead sheath.

As a result cables provided with the arrangement forming the subject of the present invention are cooled better, all other things being otherwise equal than cables constructed according to the ordinary methods; they may therefore carry a much heavier current without heating.

The methods just described present over all those that have been proposed for obtaining similar results the following advantages:

(1) The impregnation of the paper which covers each of the conductors is in no way interfered with.

(2) In the various methods which have hitherto been proposed the contact between the lead sheath and the conducting strips placed around each conductor is very imperfect; therefore the conduction of heat to the lead sheath is very slight. According to the present invention the conducting surfaces obtained through the covering of the packings are in contact with the lead sheath on nearly the entire internal surface of the latter. The heat distribution is therefore much better than that obtained with the other methods.

In the case of a transmission of energy in the form of alternating single phase current, two conductor cables are used, for the transmission of two phase alternating current, cables with four conductors are used.

In these various cables the spaces left between the various conductors assembled within the lead sheath are filled by packings of the same nature as those used in three conductor cables. The methods described above for rendering conducting the surfaces of the packings of cables with three conductors apply without modifications for rendering conducting the surfaces of the two packings of cables having two conductors and to render conducting the surfaces of the five packings of cables with four conductors. The effects and advantages which have been indicated above as resulting from the use of these methods for the construction of three conductor cables remain the same when these methods are used for making cables having two or four conductors.

Having thus described my invention, I claim:—

An electric cable having a lead sheath combining several separately insulated conductors, without conducting covering around the insulation, a central packing filling the space formed between the conductors, packings filling the spaces formed between the conductors and the lead sheath, a conducting covering enveloping each packing in such a manner that all the faces of each packing are enveloped by the same conducting covering surrounding each packing, said conducting coverings being conductively connected inter se and with the lead sheath.

In witness whereof I have hereunto set my hand.

JULES DELON.